United States Patent [19]

McMillen

[11] 4,308,462

[45] Dec. 29, 1981

[54] ENGINE STARTER SYSTEM WITH IMPROVED STRUCTURE FOR MAINTAINING ENGINE ENGAGEMENT

[75] Inventor: Bobby E. McMillen, Columbus, Miss.

[73] Assignee: AMBAC Industries, Incorporated, Farmington, Conn.

[21] Appl. No.: 113,076

[22] Filed: Jan. 17, 1980

[51] Int. Cl.[3] .......................... F02N 11/00; H02P 15/00

[52] U.S. Cl. .......................................... 290/38 R; 310/93

[58] Field of Search ...................... 290/38, 38 A, 38 X; 123/179 J, 179 CC; 74/6, 7 C, 7 R

[56] References Cited

U.S. PATENT DOCUMENTS

| | | | |
|---|---|---|---|
| 1,860,504 | 5/1932 | James | 310/93 |
| 2,258,455 | 6/1940 | Jones | 74/6 |
| 2,863,320 | 12/1958 | Mendenhall | 74/6 |
| 3,399,576 | 9/1968 | Seilly et al. | 290/38 R |

*Primary Examiner*—J. D. Miller
*Assistant Examiner*—D. L. Rebsch
*Attorney, Agent, or Firm*—John C. Dorfman

[57] ABSTRACT

An electric starter assembly and, more specifically, an improved drive assembly that is responsive to inertia encountered during the fast acceleration of the starter armature and that also is responsive to the inertia encountered as a result of providing for a braking or rapid deceleration of the starter armature. The assembly also provides a positive engagement between the drive assembly of the starter motor and the engine member to be rotated during the cranking cycle. Engagement is maintained so long as the motor is energized, even if the engine is running.

17 Claims, 5 Drawing Figures

ENGINE STARTER SYSTEM WITH IMPROVED STRUCTURE FOR MAINTAINING ENGINE ENGAGEMENT

BACKGROUND OF THE INVENTION

This invention relates to an improved electric starter for an internal combustion engine.

In the past there have been numerous methods devised involving mechanisms to smoothly engage and reliably maintain engagement during the cranking cycle and, then, to smoothly disengage the starter from the engine once the engine has started. These methods have all either fallen short of one or more of the objectives or have resulted in bulky, heavy, and costly mechanisms making them impractical for many applications. For example, these earlier approaches include the use of a solenoid, the purpose of which is to move the drive axially on the starter shaft for engagement with the member on the engine to be rotated and to hold the drive in contact with the member during cranking.

Another approach, usually used on small engines and correspondingly smaller starters, is the use of drives that depend entirely on the acceleration of the armature shaft and the inertia of drive to provide axial movement of the drive along threaded areas between the drive and rotating shaft and, thereby, provide initial engagement of the drive with the engine member. This type drive has an undesirable characteristic, however, in that it is susceptible to premature disengagement from the engine rotating member resulting in false starts and; therefore, requiring repetitive attempts to start the engine. To overcome this problem, numerous approaches have been taken to lock this type drive into engagement with the engine. All of these approaches have been less than satisfactory, at least in part, because the various locking in mechanisms would stick and, thereby, not allow disengagement between the rotating engine member and the drive after cranking.

SUMMARY OF THE INVENTION

This invention provides an improved electric starter that provides the features of smooth engagement and disengagement and, also, provides a positive "lock-in" means while the engine is being cranked. The engagement of this drive utilizes the inertia between the accelerating shaft and the drive to provide axial movement of the drive along the shaft and, for disengagement, forces resulting from the flywheel of the cranked engine against the pinion and the inertial effect between the decelerating shaft and the drive are utilized in such a manner to assure the release of the "lock-in" means and, thereby, quickly allow the drive to return to a disengaged position.

DESCRIPTION OF THE PREFERRED EMBODIMENTS

Figure 1:
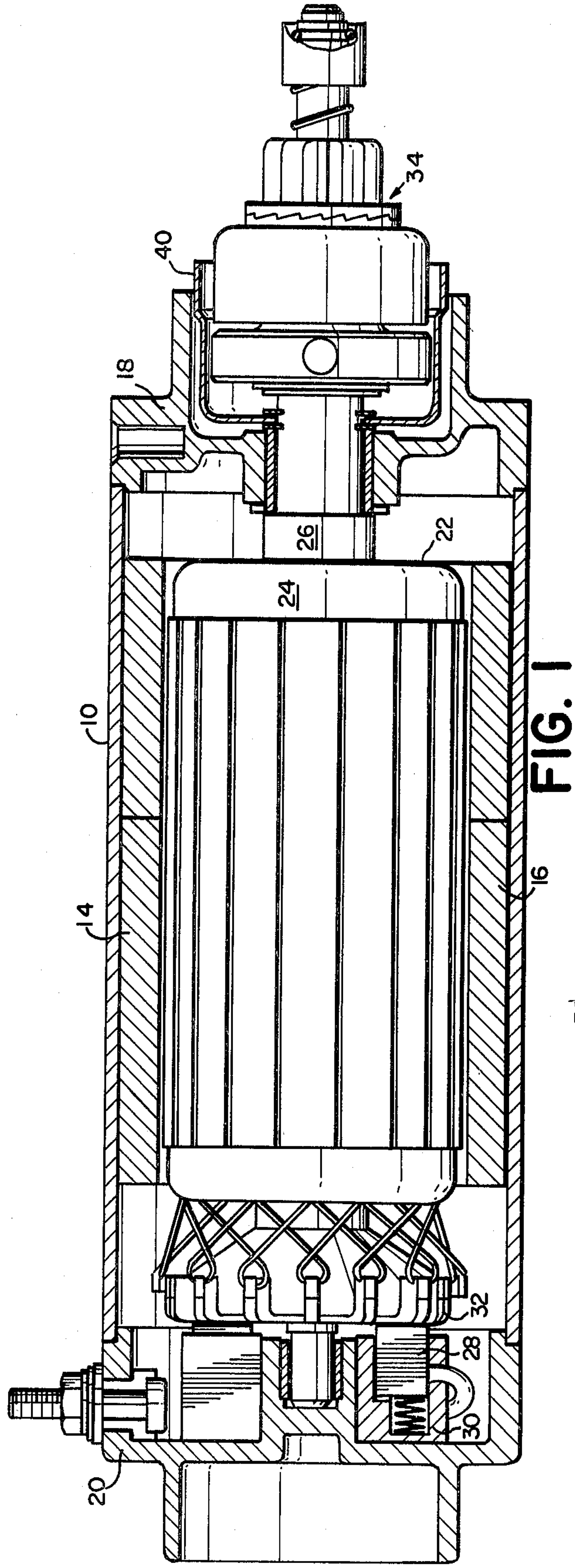
FIG. 1 is a side view of the starter of the present invention with the motor housing in section and with the motor armature and the drive in elevation.

Referring to FIG. 1, the starter motor consists of a tubular housing 10 with permanent magnets providing fields 14 and 16 secured therein. End caps 18 and 20 close each end of the housing. A conventional armature, generally designated 22 having windings 24 has its supporting shaft 26 journaled on each of the end caps 18 and 20 and is free to rotate within the housing 10 and within the magnetic field provided by the permanent magnets 14 and 16. Current is supplied to and from the winding of the armature by four brushes 28 supported in suitable brush holders 30 within end cap 20 and spring loaded so that they are urged in good electrical contact with the commutator 32. The armature shaft 26 extends out from the housing through end cap 18, and mounted on the shaft 26 is the starter drive assembly 34, the details of which can best be seen in the sectional view thereof in FIG. 3 and will be explained fully later in the specification.

Figure 2:
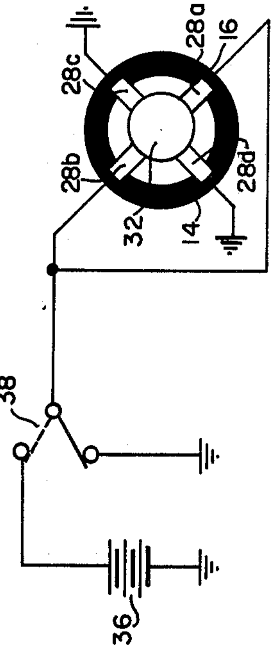
FIG. 2 is a wiring diagram for the starting system.

FIG. 2 shows the preferred circuit plan for the starter wherein two brushes **28*a* and 28*b* are selectively connected through the control switch 38 to either a source of power such as a battery 36 or to ground. The operation of the circuit is such that when the control switch is in the position represented by the dashed line, current will flow from the battery through the switch to brushes 28*a* and 28*b*, then through the armature windings and to ground through brushes 28*c* and 28*d*. When the armature is energized by current flow, a magnetic field will surround the armature and interact with the ever present magnetic field provided by the permanent magnets. The interaction of the two fields, along with the switching of the current flow in the armature provided by the commutator, will cause the armature to rotate in a conventional manner. When the control switch is positioned as represented by the solid line, the starter is disconnected from the battery and brushes 28*b* and 28*a*** are grounded through the switch. Therefore, all brushes are connected electrically together at ground providing closed circuits without an external potential source across the armature. As the armature coasts within the magnetic field provided by the permanent magnets, current is induced in its closed conductor loops and the starter then functions as a generator. Since each armature winding closed on itself provides a very low impedance, a high current is generated therein producing a magnetic force opposed to the field so that a sudden dynamic braking force is applied to the armature that slows the armature to a stop much sooner than would occur if the windings were left open.

Figure 3:
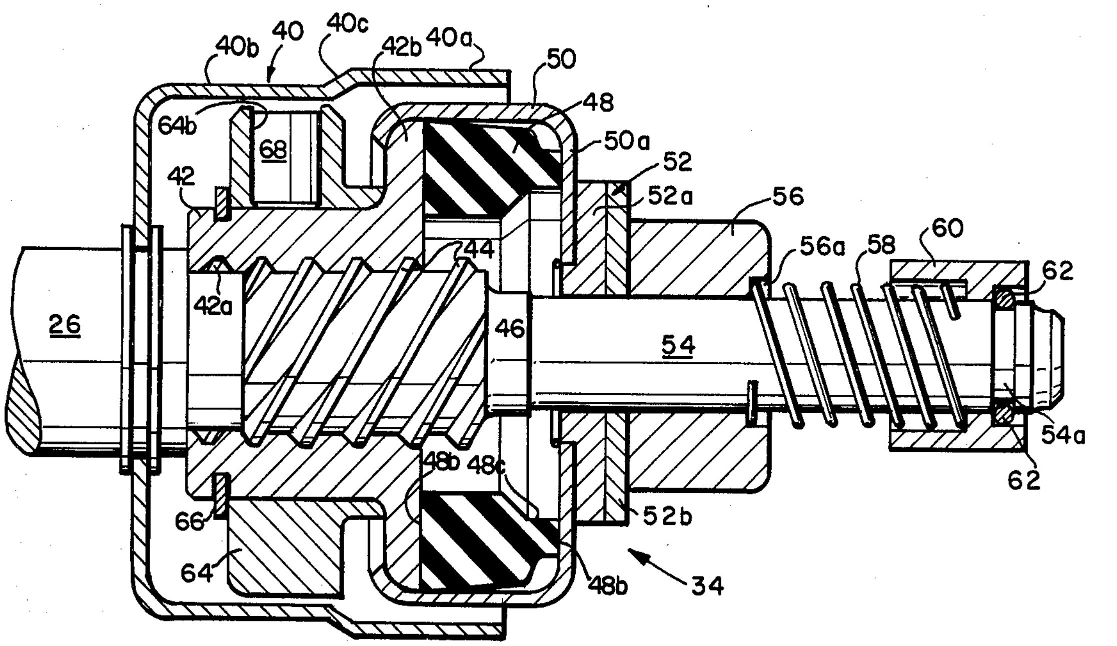
FIG. 3 is a sectional view on an enlarged scale of the starter drive assembly mounted on the starter armature shaft.

FIG. 3 is a sectional view of the starter drive assembled on the shaft 26. A cup-like member 40 is coaxially arranged and connected to the armature shaft 26 so that its open end faces away from the armature and so that it moves rotationally with but cannot move axially along the shaft. The sidewalls of cup 40 have two portions. A larger diameter portion **40*a* at the lip of the cup is separated from a smaller diameter portion 40*b* by a shoulder 40*c* providing a sort of inclined plane between the constant diameter portions 40*a* and 40*b*. A spool 42 is provided with threads 42*a* along is inner diameter to engage helical threads 44 on shaft 26. The shoulder 46*a* between the shaft 26 and its reduced diameter portion 46 provides a stop limiting movement of spool 42 toward the armature 24. This threaded engagement between the spool 42 and the shaft portion 46** is designed so as to allow free movement within limits between them. The spool 42 has an outward extending circumferential flange 42*b* at the end remote from the armature against whose flat outer face rests a flat face 48*a* of a ring 48. Spaced axially from flat face 48*a* is a resilient generally parallel flat face 48*b* terminating necked down, reduced width section 48*c* of the ring. Flat face 48*b* rests against the flat inside bottom wall 50*a* of a cup shaped intermediate member 50. Intermediate cup shaped member 50 is of smaller diameter than cup 40 and is coaxially and rotatably supported by clutch plate 52*a* on smaller diameter shaft extension 54. Cup 50 brackets resilient ring 48 and its lip 48 and is formed to conform to the rounded shafts and embrace the outer edge of flange 42*b* and engage, thereby captivating, the resilient ring 48 between the flat planar face of the flange 42*b* of spool 42 and the inner bottom wall 50*a* of the cup 50. The outer face of bottom wall 50*a* is in this instance fixedly secured to plate 52*a* of a unidirectional clutch 52. The other plate 52*b* of the clutch is also rotatably supported on shaft portion 54. Plates 52*a* and 52*b* have interfitting radially extending teeth that have a steep slope on one side and a shallow slope on the other. It is anticipated, however, that other type clutches could be used such as a roller type clutch, for instance. As shown, a pinion gear 56 or other suitable engine engaging member, is secured to the second plate 52*b* of the clutch 52 and like that plate is rotatably supported on shaft portion 54. Thus, the pinion 56 and the clutch plates 52*a* and 52*b* are journaled on the shaft portion 54. A helical spring 58 surrounds the armature shaft portion 54. One end of spring 58 rests within a recess 56*a* of the pinion 56. The other end of the spring 58 is confined within a cup shaped stop member 60. The cup shaped stop 60 is held onto the shaft portion 54 against action of the spring 58 by a retaining ring 62 in a circumferential groove 54*a* in the armature shaft portion 54.

Figure 4:
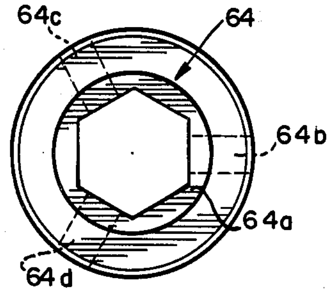
FIG. 4 is an end view of the lock-in collar seen in section in FIG. 3.
Figure 5:
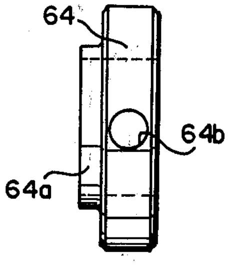
FIG. 5 is a side view of the collar of FIG. 4.

A lock-in 64 collar seen in FIGS. 4 and 5 engages the outer diameter of the spool 42 and is held in place axially between flange 42*b* and snap ring 66 and rotates with spool 42. The collar 64 and the spool 42 are preferably secured against rotation relative to one another so that relative rotation in not possible, for example, by interfitting cross sections, such as the hexagonal shape shown. Collar 64 is provided with spacing flange 64*a* which engages and spaces collar 64 from flange 42*b*.

The collar 64, preferably, is formed of a suitable plastic material such as Delrin (a trade name of E. I. du Pont deNemours & Company, Incorporated, Wilmington, Delaware, for their Acetal resins). In FIGS. 4 and 5 it can be seen collar 64 has three equally spaced radially directed cylindrical bores 64*b*, 64*c*, and 64*d* that extend from the inside flats of the tubular member to the outer diameter thereof thereby forming three cylindrical openings as best seen in FIG. 3, the sectional view shows the position of one of the three pins 68. The pins 68 are free to move radially within the confines of the cylinders of the collar, and their outward movement is limited by the cup 40.

Having thus identified the functional components of the invention and their relationship to each other, the operation thereof is as follows:

The starter motor is mounted on an engine in a conventional manner such that the pinion 56 is out of engagement with and is axially spaced from mating teeth on the engine flywheel (not shown) most of the time during which the starter is inoperative. When the engine is to be started, the control switch 38 is closed to connect the starter to the battery 36, which causes the starter motor armature 22 and its supporting shaft 26 to rotate. The resulting rotational acceleration of the armature causes the starter drive assembly 34 to move axially to the right along the armature shaft portion 46 because engagement of the threads of worm 44 on the armature shaft 46 with the threads 42*a* of the drive assembly 13. The pinion 56 moves axially into engagement with the toothed surface of the engine flywheel and comes to rest against the stop member 60*a* on cup 60 in which position full operating mesh is obtained. Upon meshing, torque from the starter motor is applied to drive the flywheel and the engine begins to rotate. The movement of the starter drive assembly 34 causes pin guide collar 64 to move with respect to the axially fixed retained housing 40 past the step to the position opposite the larger diameter portion 40*d*. As the drive assembly 34 rotates, centrifugal force moves the pins 68 out into contact with the interior surface of the larger diameter portion 40*a* of the retainer housing 40. The pins remain in the extended position in contact with the wall 40*a* of retainer housing 40 so long as there is sufficient speed to provide the necessary centrifugal force. Any false starts or sudden momentary acceleration of the engine flywheel which might otherwise tend to kick the pinion out of mesh with the engine flywheel is prevented by engagement of the pins 68 against the stepped shoulder 40*c* of retainer housing 40. If sudden or momentary acceleration of the engine flywheel occurs, as is often caused by an unsustained start or even more frequently encountered when the engine piston is returning from a compression stroke without combustion, the slippage between the clutch plates 52*a* and 52*b* limits such acceleration from being transmitted back to the starter armature. In this situation, the clutch will allow the pinion 56, which is in mesh with the engine flywheel, to overrun the remainder of the drive and the armature. Preferably, the dimensions of the drive parts are such that when the pinion 56 is fully engaged with the engine flywheel, the pins 68 are far enough to the right of shoulder 40*c* to allow a slight amount of movement to the left when the teeth on clutch plates 52*a* and 52*b* slip past each other during an overrun condition. Were the momentary torque and resulting increased RPM allowed to be transmitted back through the drive assembly to the starter armature, it could damage both the drive assembly and the starter motor. Also, if sustained combustion is obtained by the engine (that is, the engine starts), and the operator is slow in releasing the control switch 38, the overrunning clutch will prevent damage to the starter and drive assembly. Under normal operating conditions, once the engine has started, the control switch will be released (opened) whereupon a circuit is completed across the armature through the control switch 38. Since inertia causes the armature 22 to continue to rotate in the magnetic field provided by the permanent magnets 14, 16, the armature immediately experiences a braking effect caused by generation of a current in the armature which creates an armature polarity opposing the field of the permanent magnets. This condition causes a dynamic braking, which rapidly slows down of the armature and drive assembly. When a point in reduced RPM is reached, the centrifugal force on the radially extended pins will not prevent them from being urged by the shoulder 40*c* back toward the armature shaft the relatively smooth curves of the stepped area 40*c* of cup shaped retainer housing 40 acting as a sort of cam. It has been found through extensive tests that induced deceleration of the armature shaft greatly improves the performance of the starter system of this invention. While it is anticipated that other means of deceleration, such as mechanical and electromechanical devices could be incorporated within the system to serve this function, dynamic braking, as disclosed herein, is preferred.

A resilient ring 48 absorbs both torsional and axial shock encountered during engagement of the drive assembly with the engine flywheel. When the initial torque of the starter is applied to the engine, the resilient ring 48 compresses as the flange 42*b* of the tubular axial drive member 40 moves toward the flat face 50*a* of cover member 50*a*. Also, the driving torque of the engine engaging pinion 26 is transmitted through the resilient ring. Some slippage between rotational parts is preferably allowed to absorb the high torsional forces encoutered when the gears engage and, if incorporated, will enhance the drive's durability.

The primary function of spring 58 shown in FIG. 3 is to prevent axial movement of the drive assembly when the starter is not in use. Vibrations produced by the engine might, otherwise, cause the drive to drift out and come in contact with the rotating engine flywheel. The spring also functions to hold the unidirectional clutch plates in engagement and to supply a force which must be overcome to disengage the clutch.

Having described this invention in terms of the preferred embodiments, it is to be understood that various changes can be made to the described structure within the scope of the appended claims, and that different structures may be made within the scope of the claims.

What is claimed is:

1. An engine starter system comprising:

a starter motor having a housing magnetic field producing means;

an armature rotatably supported in said motor housing and having a shaft extending from the motor housing, said shaft having a helically threaded portion;

an axially movable member having a threaded portion that meshes with the helically threaded portion of the shaft to be axially movable relative to the shaft when relative rotatable movement occurs between them and otherwise to be rotatable with the shaft;

an axially movable member on said shaft including an engine-engaging member which engages and acts to rotate an engine in a selected axial position and means connecting the engine-engaging member to the shaft through thread mating with the threads on the shaft, the threads being oriented such that when the motor is energized the inertia axially movable member will cause it to react against the threads and move along the shaft to engine-engaging position;

stop means on the shaft limiting movement of the axially movable member whereby in one stop-engaging position said engine-engaging member engages the engine and in the other stop-engaging position it is disengaged;

resilient means acting between the shaft and the axially movable member to urge said member against the stop when the engine-engaging member is disengaged and yielding to forces generated by rotation to allow movement of the axially movable member to the position of engine engagement;

generally radially oriented movable pin means slidably supported on the axially movable member to move outward under centrifugal force when the axially movable member is rotated;

pin stop means coaxially supported on the shaft having a shoulder with a radial component such that in engine engaging position the pin means engage the discontinuity whereby the extended pin means are deterred by centrifugal force from passing back over the discontinuity to permit engine disengagement.

2. The engine starter system of claim 1 in which the pin stop means also provides means to limit the radially outward movement of the pin means.

3. The engine starter system of claim 2 in which the stop means is a cup member, the bottom of said cup being fixed to the shaft so that its side walls are coaxially oriented relative thereto and extend over the range of movement of the generally radially oriented movable pin means.

4. The engine starter system of claim 1 in which the resilient means is a helical spring acting between means on the shaft and the axially movable member.

5. The engine starter system of claim 1 in which a unidirectional clutch member is provided between the portion of the axial movable member which engages the threads on the shaft and the engine engaging member such that the normal rotational direction of the motor to crank the engine leaves the clutch engaged but relative rotation in the opposite direction will permit the clutch to slip.

6. The engine starter system of claim 1 in which there is interposed between the portion of the axially movable member which engages the threads on the engine-engaging member and the shaft a resilient member which is capable of absorbing shocks through distortion and capable of slipping if the engine engaging member and the rest of the axially movable member are not able to move in the direction of motor rotation at the same speed.

7. The engine starter system of claim 6 in which there are separate pieces of the axially movable member and rigid bridging means providing a stop limiting the maximum axial separation of the separate pieces and resilient means is held in place between the separate pieces by the bridging means which allows axial compression of the resilient means.

8. The engine starter system of claim 7 in which the resilient means is a ring of resilient material having axially spaced flat generally radially oriented faces which respectively engage generally radial faces on each of the separate pieces of the axially movable member.

9. The engine starter system of claim 3 in which a plurality of radially directed pins are slideably supported in a collar member fixed to the thread engaging portion of the axially movable member.

10. The engine starter system of claim 9 in which a single collar member having radial bores for each of the pins is provided and fixed to the thread engaging portion.

11. The engine starter system of claim 1 in which a braking means is provided to be applied to the armature to increase deceleration thereof after the engine has been started.

12. The engine starter system of claim 11 in which the braking means is provided by dynamic braking of the starter motor.

13. The engine starter system comprising:

an electric starter having a rotating shaft extending therefrom;

an engine-engaging member threadably connected to the shaft so that relative movement between the shaft and engine-engaging member will result in axial displacement between the shaft and the engine-engaging member;

a centrifugally actuated locking means to hold the engine-engaging member in contact with an engine member that is rotated during starting;

a switch means to selectively supply electrical current from a source to the engine starter;

a braking means to provide increased negative acceleration of the starter armature when the switch interrupts current flow to the starter.

14. The engine starter of claim 13 in which the braking means is provided by dynamic braking of the starter motor.

15. The engine starter system of claim 13 in which the switch means provides a first current path from the electrical source to the engine starter when in a first position and provides a second current path for generated current flowing in the starter during dynamic braking.

16. The engine starter system of claim 1 or 13 wherein the engine starter has a permanent magnet field.

17. An engine starter drive assembly comprising:

a tubular member having internal threads that are adaptable to mesh with a threaded portion of an engine starter shaft;

a cover member extending over and encompassing a portion of the tubular member;

a resilient member contained within the cover member and positioned between one end of the tubular member and a facing wall of the housing member;

a unidirectional clutch member having two faces, one of which is connected to the housing member;

a toothed engine-engaging member connected to the other one of said two faces of the clutch member;

a spring means to provide a force in a direction opposite to the direction required to cause engagement of the engine-engaging member with the engine means to be rotated during starting;

a collar member that is connected to the tubular member so as to rotate therewith;

a radially movable member contained within a recess in the collar member and that is adapted to be actuated by centrifugal force in a radially outward direction with respect to the axis of rotation of the collar member; and a retainer housing member which has a step shaped wall which extends over the radially movable members and limits the movement thereof.

* * * * *